United States Patent
Slavik

(10) Patent No.: US 7,741,733 B1
(45) Date of Patent: Jun. 22, 2010

(54) MODULAR BATTERY CONTROL APPARATUS

(75) Inventor: William H. Slavik, St. Charles, IL (US)

(73) Assignee: Intellitec Products, LLC, Deland, FL (US)

( * ) Notice: Subject to any disclaimer, the term of this patent is extended or adjusted under 35 U.S.C. 154(b) by 213 days.

(21) Appl. No.: 12/098,680

(22) Filed: Apr. 7, 2008

(51) Int. Cl.
*H02J 1/10* (2006.01)
(52) U.S. Cl. .......................... 307/43; 307/80
(58) Field of Classification Search ............. 307/9.1, 307/10.7, 43, 80, 85; 320/104
See application file for complete search history.

(56) References Cited

U.S. PATENT DOCUMENTS

2006/0125443 A1 * 6/2006 Bolduc ................. 320/104

* cited by examiner

*Primary Examiner*—Albert W Paladini
*Assistant Examiner*—Carlos Amaya
(74) *Attorney, Agent, or Firm*—Ronald E. Smith; Smith & Hopen, P.A.

(57) ABSTRACT

A modular battery control apparatus includes a first stationary contact adapted for electrical communication with coach loads and a battery charger, a second stationary contact adapted for electrical communication with a coach battery, a third stationary contact adapted for electrical communication with a chassis battery, and a fourth stationary contact adapted for electrical communication with chassis loads and an alternator. First, second, and third movable contacts are respectively attached to first, second, and third latching solenoids and are adapted to abuttingly engage and disengage the respective first and second stationary contacts, second and third stationary contacts, and third and fourth stationary contacts. A controller selectively activates and deactivates the first, second, and third latching solenoids and a user-controlled switch panel communicates with the controller.

6 Claims, 2 Drawing Sheets

MODULAR BATTERY CONTROL APPARATUS

FIELD OF THE INVENTION

This invention relates, generally, to control of batteries for operating electrical equipment on motor homes, boats, or other vehicles where AC power is not available. More particularly, it relates to a modular design that provides multiple advantages.

DESCRIPTION OF THE PRIOR ART

Two or more batteries are typically used to operate the electrical equipment used in a motor home or boat. A first battery is used primarily for engine functions and a second for "house" functions. In an ideal installation, all of the batteries are charged when any one of them is charged. Moreover, the batteries are isolated from one another when no battery is being charged to prevent one load from discharging more than one battery. The batteries are disconnected from any loads when the vehicle is put into storage to prevent extraneous loads from inadvertently discharging the batteries.

These features are usually provided in the prior art by employing three individual contactors such as Intellitec's Battery Disconnect (Intellitec Part no. 01-00055-001) relays and an isolator relay (Intellitec Part no. 77-90000-100) driven by an Intellitec Bi-Directional Isolator Relay Delay (BIRD) (Intellitec Part No. 00-00). These individual components are typically mounted in an enclosure and connected together with heavy cable or copper bus bars.

There are several problems associated with this prior art apparatus. It is somewhat labor-intensive to assemble and if the assembly is sub-standard, poor connections may result. The heavy cables or copper bus bars used for the interconnections also cause voltage drops and heat loss.

Thus there is a need for an apparatus that reduces the amount of labor involved, the chances that poor connections will be made, and the voltage drops and heat loss caused by the respective interconnections of the heavy cables or copper bus bars.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an improved battery control apparatus is now met by a new, useful, and non-obvious invention.

The novel assembly includes three (3) movable contactors built into a single housing with shared stationary contacts to eliminate the need for the interconnections of the prior art. This novel arrangement reduces the stud/contact count from six (6) (two (2) per contactor) to four (4).

This reduction in the number of contacts is accomplished by sharing the contact/studs associated with prior art connections. This eliminates the interconnection cables or bus bars and the associated voltage drops and resulting heat loss that accompany such connections. It also reduces the amount of labor needed to assemble the individual pieces and eliminates the possibility of bad connections.

The novel movable contactors are associated with solenoids of the latching variety. They incorporate the principles taught in U.S. Pat. No. 4,628,289 to Huber, using a magnet that is either attracted to the solenoid plunger or repelled, depending upon the polarity of the voltage applied to provide the latching. To make a connection, power is momentarily applied to the coil, causing plunger retraction and closing the contacts. The magnet latch is attracted to the end of the plunger so that the plunger cannot return to its rest position when the power is removed.

To disconnect, power is momentarily applied to the coil in the reverse direction. This forces the magnet away from the plunger, allowing the plunger to return to the rest position and thereby opening the contacts.

When the contactor is latched, the plunger is in contact with the battery studs and this connects the entire solenoid case to the battery. The presence or absence of this potential is used to indicate whether the contactor is latched or open, respectively.

The latching eliminates the need for power to hold the contacts closed, thereby avoiding needless discharge of the batteries.

The control circuitry can "learn" the state of each solenoid. The polarity of the connecting wires for the solenoid is unknown when the unit is assembled. When activated for the first time, a controller attempts to operate the solenoid and then "reads" whether the contactor is latched or opened. Once it "knows" whether the contactor is latched or open, it puts that information into memory and thereafter consults said memory so that it can apply the proper polarity voltage to either latch or un-latch the solenoid.

A sensor is also provided to sense when a coach or chassis battery charge is nearly gone. The sensor generates and sends a signal to the control circuitry when a predetermined threshold is detected to disconnect the battery to prevent its complete discharge.

More particularly, the novel modular battery control apparatus includes a first stationary contact adapted for electrical communication with coach loads and a battery charger, a second stationary contact adapted for electrical communication with a coach battery, a third stationary contact adapted for electrical communication with a chassis battery, and a fourth stationary contact adapted for electrical communication with chassis loads and an alternator.

The novel modular battery control apparatus further includes a first solenoid and a first movable contact attached to the first solenoid. The first movable contact is adapted to abuttingly engage and disengage the first and second stationary contacts.

The novel modular battery control apparatus further includes a second solenoid and a second movable contact attached to the second solenoid. The second movable contact is adapted to abuttingly engage and disengage the second and third stationary contacts.

The novel modular battery control apparatus further includes a third solenoid and a third movable contact attached to the third solenoid. The third movable contact is adapted to abuttingly engage and disengage the third and fourth stationary contacts.

The control circuitry is a sense and control means adapted to selectively activate and deactivate the first, second, and third solenoids in response to user-input signals from a remote user-controlled switch panel that is adapted to communicate with the sense and control means.

In a preferred embodiment, the first, second, and third solenoids are latching solenoids so that no energy is required to hold the solenoids in their respective engaged or disengaged positions.

A protective enclosure houses the first, second, and third solenoids and the sense and control means.

The first, second, third, and fourth stationary contacts are disposed in penetrating relation to the protective enclosure so that first respective parts thereof are disposed within the protective enclosure and second respective parts thereof are positioned externally of the protective enclosure.

A memory means is included in the sense and control means. The sense and control means is unable to determine a polarity of each solenoid when each solenoid is energized for a first time. The sense and control means is operative to determine whether a solenoid latches by entering into engagement with its associated stationary contacts or unlatches by disengaging from its associated stationary contacts when the solenoid is energized for a first time. The solenoid is adapted to generate and send a first signal to the memory means when a determination is made that the solenoid latched when initially energized, thereby indicating a first polarity, and the solenoid is adapted to generate and send a second signal to the memory means when a determination is made that the solenoid unlatched when initially energized, thereby indicating a second polarity. The sense and control means accesses the memory means before sending subsequent signals to the solenoid so that said subsequent signals will be of the correct polarity.

The sense and control means is also adapted to monitor a charge on the coach battery and the chassis battery and to generate and send a disconnect signal to prevent complete discharge if the charge on a monitored battery drops below a predetermined threshold.

An important object of the invention is to eliminate the cables or bus bars used in prior art assemblies.

Additional objects are to reduce labor time, to eliminate the poor connections associated with such labor, to reduce the number of electrical contacts, and to eliminate the voltage drops and heat loss associated with such contacts.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
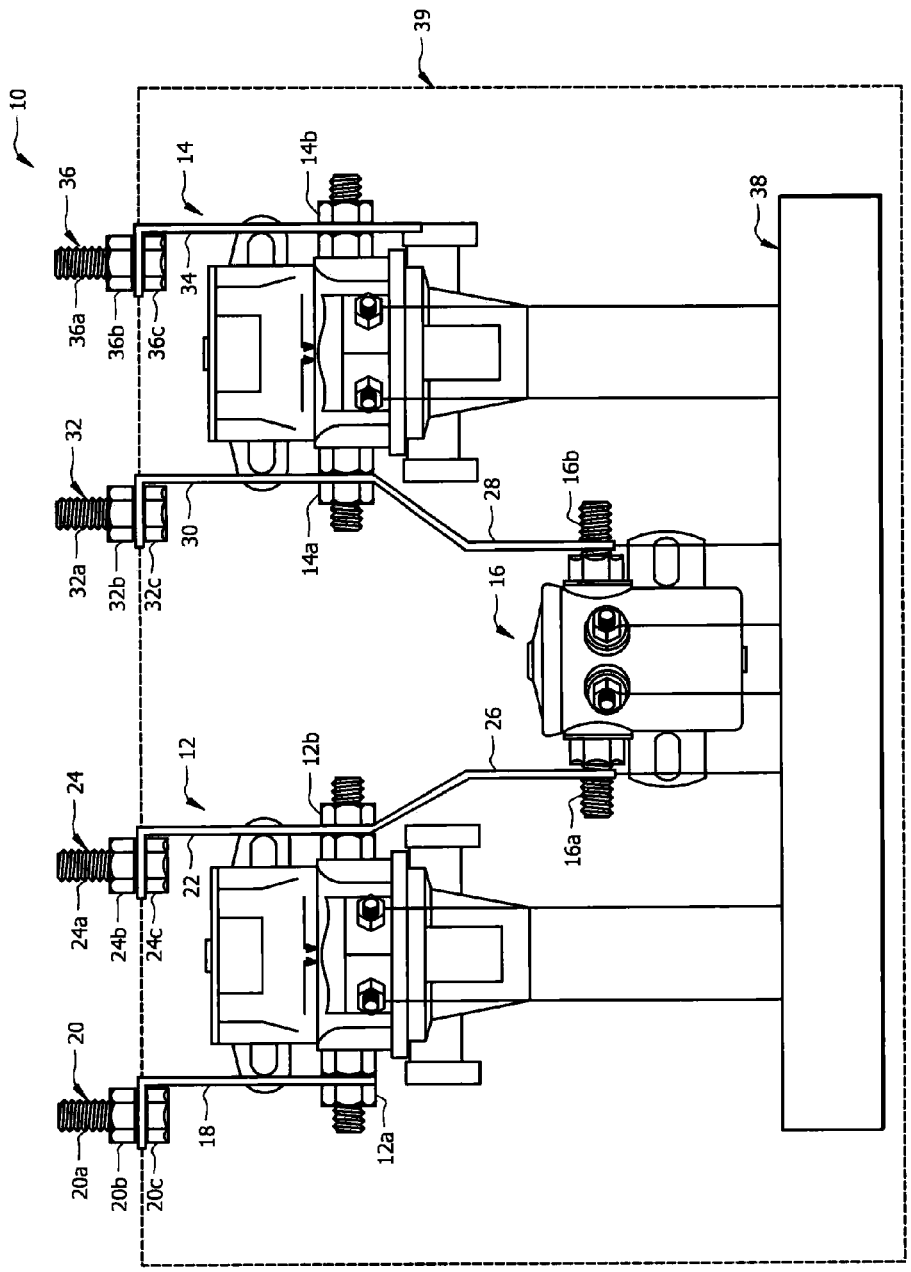
FIG. 1 is a diagrammatic depiction of a prior art apparatus.

Referring now to FIG. 1, it will there be seen that an electrical circuit diagram for a prior art apparatus is denoted as a whole by the reference numeral 10.

Prior art battery control apparatus 10 includes three (3) stationary contactors 12, 14, and 16. Stationary contactors 12 and 14 are built as individual pieces and are then assembled with stationary metal can contactor 16.

Each stationary contactor has two (2) copper studs. More particularly, contactor 12 has studs 12a and 12b, contactor 14 has studs 14a and 14b, and metal can contactor 16 has studs 16a and 16b.

Six (6) copper bus bars or heavy cables are required to make assembly 10 functional.

First copper bus bar or heavy cable 18 provides electrical communication between copper stud 12a and stationary contact 20 that is in electrical communication with coach loads and a battery charger. Contact 20 includes an externally threaded screw 20a which is engaged by cap nut 20b and base nut 20c that are disposed in sandwiching relation to a distal end of bus bar or heavy cable 18.

Second copper bus bar or heavy cable 22 provides electrical communication between copper stud 12b and stationary contact 24 that is in electrical communication with the coach battery. Contact 24 includes externally threaded screw 24a which is engaged by cap nut 24b and base nut 24c that are disposed in sandwiching relation to a distal end of bus bar or heavy cable 22.

Third copper bus bar or heavy cable 26 provides electrical communication between copper stud 12b and copper stud 16a.

Fourth copper bus bar or heavy cable 28 provides electrical communication between copper stud 16b and copper stud 14a.

Fifth copper bus bar or heavy cable 30 provides electrical communication between copper stud 14a and stationary contact 32 that is in electrical communication with the chassis battery. Contact 32 includes externally threaded screw 32a which is engaged by cap nut 32b and base nut 34c that are disposed in sandwiching relation to a distal end of copper bus bar or heavy cable 22.

Sixth copper bus bar or heavy cable 34 provides electrical communication between copper stud 14b and stationary contact 36 that is in electrical communication with chassis loads and an alternator. Contact 36 includes externally threaded screw 36a which is engaged by cap nut 36b and base nut 36c that are disposed in sandwiching relation to a distal end of copper bus bar or heavy cable 34.

Stationary contactors 12, 14, and 16 are in electrical communication as depicted with sense and control electronics 38. Said sense and control electronics is electrically connected to a user-operated remote switch panel, not shown.

Protective enclosure 39 houses all of the parts except the exposed parts of screws 20a, 24a, 32a, and 36a and cap nuts 20b, 24b, 32b, 36b.

Prior art battery control apparatus 10 is commercially available from Intellitec, Inc. as part number 00-00524-000. A brochure with further information about said battery control unit is available at www.intellitec.com.

Figure 2:
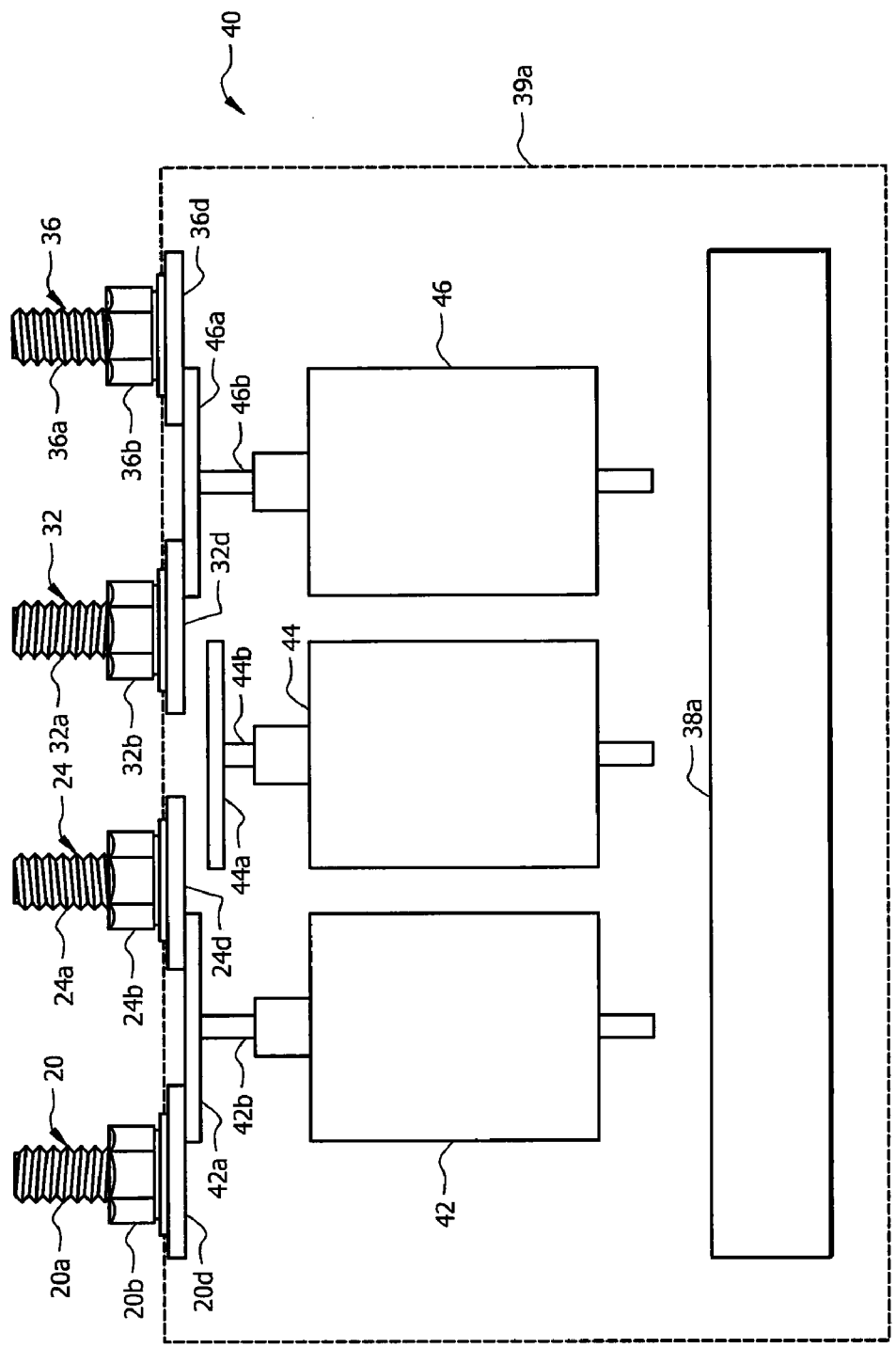
FIG. 2 is a diagrammatic depiction of the preferred embodiment.

The copper bus bars or heavy cables are eliminated in the novel structure depicted in FIG. 2 and denoted 40 as a whole.

Novel modular battery control apparatus 40 includes stationary contacts 20, 24, 32, and 36 that are in electrical communication with coach loads and a battery charger, the coach battery, the chassis battery, and chassis loads and an alternator, respectively, as in the prior art battery control apparatus. As in the prior art assembly, the exposed parts of screws 20a, 24a. 32a, and 36a and cap nuts 20b, 24b, 32b, and 36b are positioned externally of enclosure 39a.

Base nuts 20c, 24c, 32c, and 36c are replaced by flat movable contacts 20d, 24d, 32d, and 36d, respectively, and copper bus bars or heavy cables 18, 22, 30, and 34 are eliminated, together with copper bus bars or heavy cables 26 and 28.

Latching solenoids 42, 44, and 46 are housed within protective enclosure 39a, together with sense and control electronics 38a which is the same as the sense and control electronics 38 of the prior art. Said sense and control electronics 38a is electrically connected to a remote switch panel, not shown.

Flat movable contacts 42a, 44a, and 46a are secured to plungers 42b, 44b, and 46b of latching solenoids 42, 44, and 46, respectively.

Latching solenoid 42 is a coach battery disconnect relay. When energized, it provides electrical communication between sense and control electronics 38a and stationary contacts 20 and 24.

Latching solenoid 44 is an isolator relay. When energized, it provides electrical communication between sense and control electronics 38a and stationary contacts 24 and 32.

Latching solenoid 46 is a chassis battery disconnect relay. When energized, it provides electrical communication between sense and control electronics 38a and stationary contacts 32 and 36.

Copper bus bars or heavy cables 18, 22, 26, 28, 30, and 34 are thus eliminated, thereby substantially reducing the amount of copper used, the amount and cost of assembly labor required, the number of connections and thus the probabilities of making bad connections, as well as the voltage drops and heat loss associated with such bus bars, cables, and high number of connections.

In the preferred embodiment, latching solenoids 42, 44, and 46 incorporate the principles disclosed in U.S. Pat. No. 4,628,289 to Huber, which patent is incorporated herein by reference. This latching avoids needless battery discharge by eliminating the prior art need to supply power to hold electrical contacts in a closed position.

When novel unit 40 is initially assembled, sense and control electronics 38a cannot determine the polarity of the connecting wires for each solenoid. Advantageously, when the unit is operated for the first time, electronics 38a attempts to operate each solenoid and then determines whether or not the contactor latched or opened when power was applied. The polarity determination is then made and saved into memory so that for all subsequent operations, electronics 38a will apply the proper polarity voltage to either latch or unlatch the contactors.

Electronics 38a also monitors the charge on each battery and sends a disconnect signal to prevent complete discharge if the charge drops below a predetermined threshold.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A modular battery control apparatus, comprising:
    a first stationary contact adapted for electrical communication with coach loads and a battery charger;
    a second stationary contact adapted for electrical communication with a coach battery;
    a third stationary contact adapted for electrical communication with a chassis battery;
    a fourth stationary contact adapted for electrical communication with chassis loads and an alternator;
    a first solenoid;
    a first movable contact attached to said first solenoid, said first movable contact adapted to abuttingly engage and disengage said first and second stationary contacts;
    a second solenoid;
    a second movable contact attached to said second solenoid, said second movable contact adapted to abuttingly engage and disengage said second and third stationary contacts;
    a third solenoid;
    a third movable contact attached to said third solenoid, said third movable contact adapted to abuttingly engage and disengage said third and fourth stationary contacts;
    sense and control means for selectively activating and deactivating said first, second, and third solenoids; and
    a user-controlled switch panel adapted to communicate with said sense and control means.

2. The modular battery control apparatus of claim 1, further comprising:
    said first, second, and third solenoids being latching solenoids so that no energy is required to hold said solenoids in their respective engaged or disengaged positions.

3. The modular battery control apparatus of claim 1, further comprising:
    a protective enclosure for housing said first, second, and third solenoids and said sense and control means.

4. The modular battery control apparatus of claim 3, further comprising:
    said first, second, third, and fourth stationary contacts disposed in penetrating relation to said protective enclosure so that first respective parts thereof are disposed within said protective enclosure and second respective parts thereof are positioned externally of said protective enclosure.

5. The modular battery control apparatus of claim 1, further comprising:
    a memory means included in said sense and control means;
    said sense and control means being unable to determine a polarity of each solenoid when each solenoid is energized for a first time;
    said sense and control means being operative to determine whether a solenoid latched by entering into engagement with its associated stationary contacts or unlatched by disengaging from its associated stationary contacts when said solenoid is energized for a first time;
    said solenoid adapted to send a first signal to said memory means when a determination is made that said solenoid latched when initially energized, thereby indicating a first polarity, and said solenoid adapted to send a second signal to said memory means when a determination is made that said solenoid unlatched when initially energized, thereby indicating a second polarity, so that said sense and control means accesses said memory means before sending subsequent signals to said solenoid so that said subsequent signals will be of the correct polarity.

6. The modular battery control apparatus of claim 1, further comprising:
    said sense and control means adapted to monitor a charge on said coach battery and said chassis battery;
    said sense and control means adapted to generate and send a disconnect signal to prevent complete discharge if the charge on a monitored battery drops below a predetermined threshold.

* * * * *